Figure 4:
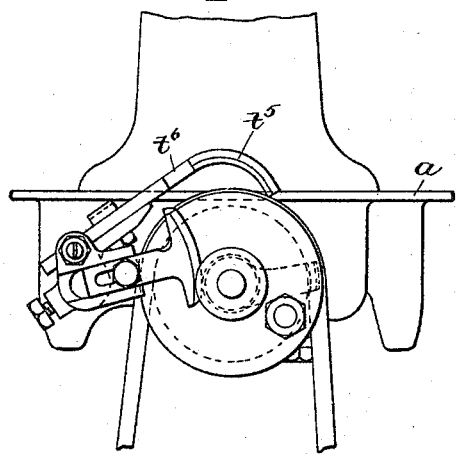

(No Model.) 2 Sheets—Sheet 1.
R. L. LYONS.
STOP MECHANISM.
No. 579,594. Patented Mar. 30, 1897.
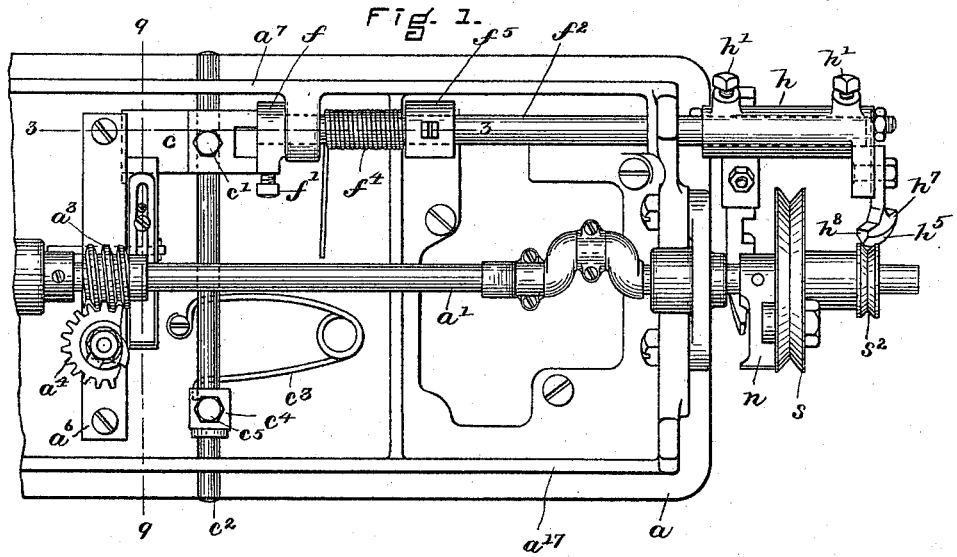
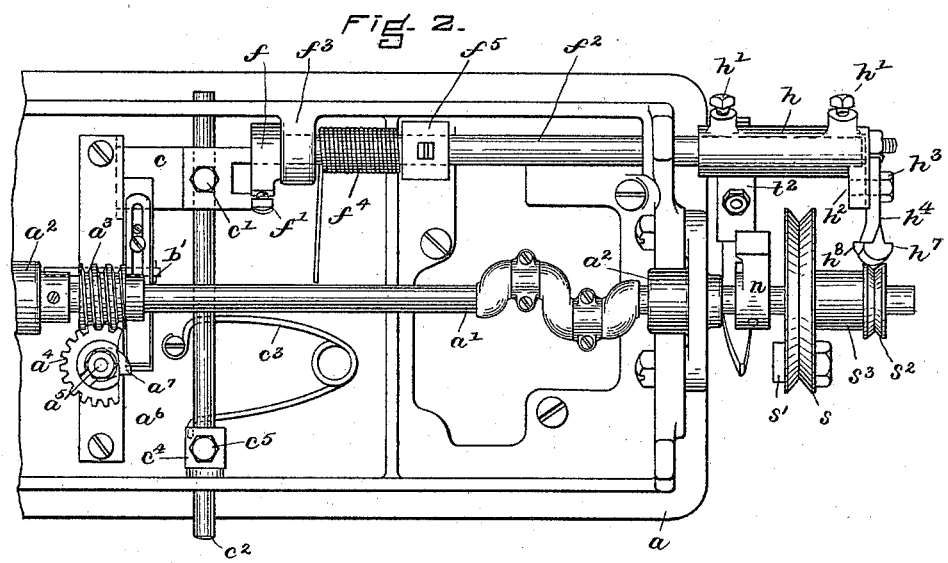
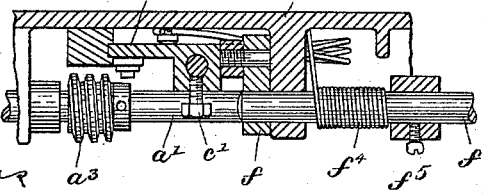
WITNESSES.
A. D. Harrison.
A. D. Adams
INVENTOR.
R. L. Lyons
by
Wright Brown & Quinby
Attys.

(No Model.) 2 Sheets—Sheet 2.

R. L. LYONS.
STOP MECHANISM.

No. 579,594. Patented Mar. 30, 1897.

WITNESSES.
A. D. Harrison.
A. D. Adams.

INVENTOR.
R. L. Lyons.

UNITED STATES PATENT OFFICE.

ROBERT L. LYONS, OF WALTHAM, MASSACHUSETTS, ASSIGNOR TO THE UNION BUTTON SEWING MACHINE COMPANY, OF BOSTON, MASSACHUSETTS.

STOP MECHANISM.

SPECIFICATION forming part of Letters Patent No. 579,594, dated March 30, 1897.

Application filed February 7, 1896. Serial No. 578,324. (No model.)

*To all whom it may concern:*

Be it known that I, ROBERT L. LYONS, of Waltham, in the county of Middlesex and State of Massachusetts, have invented certain new and useful Improvements in Stop Mechanism for Sewing or other Machines, of which the following is a specification.

This invention has for its object the production of a new and improved apparatus for stopping sewing and other machines; and it consists in the novel features of construction and relative arrangement of parts hereinafter fully described in the specification, clearly illustrated in the drawings, and particularly pointed out in the claims.

Reference is to be had to the accompanying sheets of drawings, forming a part of this application, in which like characters indicate like parts wherever they occur.

Figure 5:
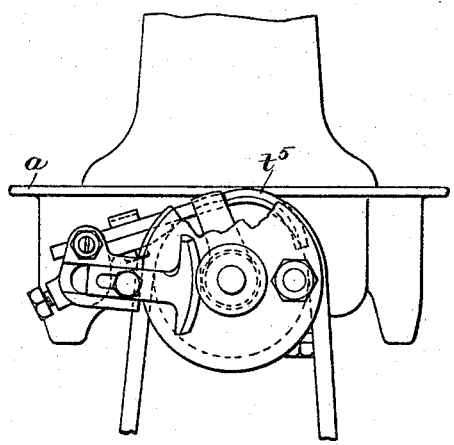
Figure 7:
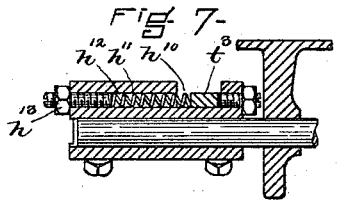
Figure 6:
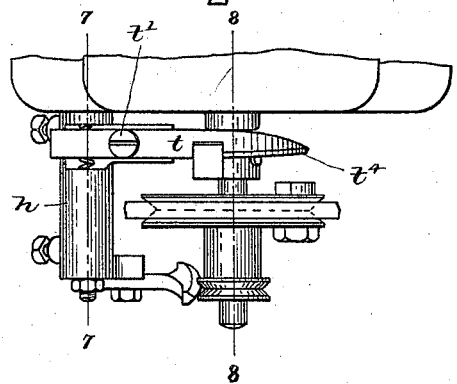
Figure 8:
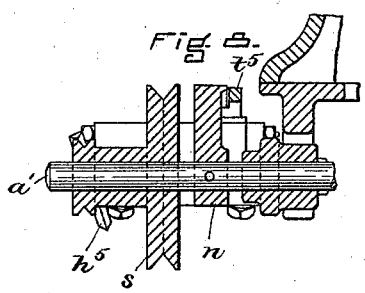
Figure 9:
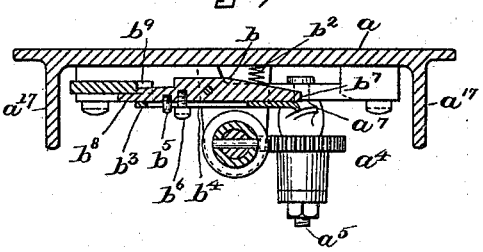

Figure 1 represents an inverted plan view of the bed-plate of a sewing-machine upon which is mounted a stopping apparatus constructed in accordance with my invention, the clutch being shown in operation. Fig. 2 represents a similar view showing the clutch disengaged and the stopping apparatus operated to disengage the clutch to stop the machine. Fig. 3 represents a detail sectional view on the line 3 3 of Fig. 1. Fig. 4 represents an end elevation of the parts of the stopping apparatus in the position shown in Fig. 1. Fig. 5 represents a similar view showing the parts of the stopping apparatus in the position shown in Fig. 2. Fig. 6 represents a top plan view of the mechanism shown in Fig. 5. Fig. 7 represents a detail sectional view on the line 7 7 of Fig. 6. Fig. 8 represents a detail sectional view on the line 8 8 of Fig. 6. Fig. 9 represents a detail sectional view on the line 9 9 of Fig. 1.

Referring to the drawings, in the embodiment of my invention therein shown and selected by me for the purpose of illustrating my invention $a$ represents a bed-plate of a sewing-machine of any preferred style.

$a'$ represents the main shaft, mounted on suitable bearings $a^2$, connected to the bed-plate. This shaft is adapted to receive motion from some suitable source of power (not shown) and transmitting the motion to the various parts of the machine.

$a^3$ represents a worm-wheel fast upon the shaft.

$a^4$ represents a spur-gear loosely mounted on the bolt $a^5$, projecting from the plate $a^6$, secured to the bed-plate. The teeth of this gear $a^4$ mesh with the turns of the worm-wheel $a^3$ in the usual way.

$a^7$ represents a wiper carried by the gear $a^4$ and arranged to engage the under side of one arm of a pivoted pawl $b$ to tilt said pawl for a purpose hereinafter described. The pawl $b$ is pivoted intermediate its ends upon a pintle $b'$. This pawl is made up of a casting $b^2$. A plate $b^3$, provided with a slot $b^4$, is adjustably secured to the under side of this pawl by a guide-screw $b^5$ and a set-screw $b^6$. This plate is thus practically a part of the casting and is adapted to be adjusted back and forth, so that its end can be properly engaged by the wiper $a^7$ to throw the end $b^7$ of the pawl $b$ up and at the same time depress the end $b^8$. The end $b^7$ of the pawl $b$, that is acted upon by the wiper $a^7$, is heavier than the end $b^8$, so that the latter end is automatically thrown upward when permitted by the wiper $a^7$ and the plate $c$. If desired, I may employ a spring, as $a^{40}$, for this purpose. The upper side of the end $b^8$ is formed with a shoulder $b^9$, adapted to engage a plate $c$ and to hold the latter until the pawl $b$ is tripped by the wiper.

The plate $c$ is secured by a set-screw $c'$ to a sliding bolt or rod $c^2$, arranged to slide in suitable openings (not shown) in the flange $a^{17}$ of the bed-plate. A spring $c^3$ is connected at one end to the bed-plate and at its other end to a block $c^4$, secured on the rod $c^2$ by a set-screw $c^5$. One end serves to throw said rod and plate a short distance toward the shaft $a'$, the distance traveled by the plate $c$ being limited by the position of the block $c^4$ in the rod or bolt $c^2$, the former being arranged on the bolt so as to come against the flange $a^{17}$ and check the movement in the direction in which the force of the spring is exerted. The plate $c$ on one side rides between the bed-plate and the plate $a^6$. This plate upon the upper side of the bolt $c^2$ from the pawl $b$ is arranged to engage a crank-arm $f$, secured by a screw $f'$ at the end of the rock-shaft $f^2$. This rock-shaft is secured in suitable bearings $f^3$ on the under side of the bed-plate, one end of the said shaft projecting, in the form here shown, beyond the bed-plate, carrying a sleeve $h$, hereinafter described.

$f^4$ represents a spring coiled about the shaft, one end of said spring bearing against the bed-plate, the other end of said spring being secured to the shaft by a collar $f^5$. The spring $f^4$ is arranged upon the shaft $f^2$ in such a way as to be put under tension when the plate $c$ is pushed by the rod or bolt $c^2$ in the direction to make the plate engage the shoulder $b^9$ on the pawl $b$, so that when said pawl is tripped and the plate $c$ slid sufficiently to permit the arm $f$ to move the rock-shaft $f^2$ will be turned a short distance, the movement of this rock-shaft being one of oscillation rather than rotation.

$h$ represents a sleeve or member secured to the free end of the rock-shaft $f^2$ by set-screws $h'$.

$n$ represents a lug or clutch part fast upon the end of the shaft $a'$.

$s$ represents a wheel loosely mounted upon the shaft $a'$ and free to slide thereon, said wheel being provided with a lug or clutch part $s'$, adapted to engage the clutch part $n$ when the wheel is pushed toward the part $r$. This wheel is designed to be driven by any source of power and by means of the clutch part to drive the shaft $a'$ when the said parts are in engagement. The sleeve or member $h$ is arranged in close proximity to the wheel $s$ and is formed with a depending lug $h^2$. Through this lug by means of a bolt $h^3$ is adjustably secured a dog or cam $h^4$, whose operating-face $h^5$ is arranged in a plane at an angle to the axis of the shaft $a'$ and adapted to engage a groove $s^2$ on the hub $s^3$ of the wheel $s$, or it may engage the groove in the wheel. This construction might manifestly be reversed and the hub of the wheel be provided with a rib to run in a groove formed in the acting face of the cam or dog $h^4$.

The wheel $s$ is designed to be continuously driven and its clutch part $s'$ moved into and out of engagement with the clutch part $n$ when it is desired to start or stop the machine, respectively.

Referring now to Figs. 1, 2, and 6, it will be seen that the dog or cam $h^4$ controls at all times the position of the wheel $s$, and that by oscillating the rock-shaft $f^2$ the operating-face $h^5$ of the dog $h^4$ will be made to engage the groove $s^2$, thereby throwing the wheel $s$ in or out, according to the direction in which the dog is moved. This operation necessarily results from the construction and arrangement of the several parts, since the two ends $h^7$ $h^8$ of the operating face or part of the dog are in different planes.

In the arrangement shown in Fig. 1, when the end $h^8$ is in engagement with the sides of the groove $s^2$, the wheel $s$ will be clutched to the shaft $a'$. When, however, the end $h^7$, as shown in Fig. 2, is engaged with the sides of the groove $s^2$, the wheel $s$ will have been moved outward and away from the machine and unclutched from the shaft.

It is desired to provide some means whereby the shaft $a'$ will be positively stopped without jar after the wheel $s$ has been unclutched. To this end I mount upon the member or sleeve $h$ a spring-pressed stop $t$. This lever $t$ is pivoted midway its ends by a bolt $t'$ to a lug $t^2$, projecting from the sleeve $h$. One end $t^3$ of this lever $t$ is arranged in a depression $h^{10}$ of the sleeve $h$ and is pressed in one direction by a coiled spring $h^{11}$, adjustably secured in a chamber $h^{12}$ of said sleeve by a set-screw $h^{13}$. This lever or stop $t$ is arranged to be oscillated back and forth into and out of the path of the clutch part $n$, the end $t^4$ of said lever being thrown by the spring $h^{11}$ toward said clutch part and made to bear against said clutch part with a force that can be regulated by the said screw $h^{13}$. This lever is formed at its end $t^4$ with an inclined face $t^5$, terminating in a notch $t^6$. The end $t^4$ of the lever is designed to be in the position shown in Fig. 4 when the end $h^8$ of the dog $h^4$ is in engagement with the sides of the groove, as in Fig. 1. When, however, this dog is shifted to throw the wheel $s$ in the position shown in Fig. 2, the end $t^4$ of the lever $t$ is thrown down in a position to lie in the path of the clutch part $n$, the latter engaging the inclined surface $t^5$ of the lever $t$ in the first instance. The continued movement of the clutch part $r$ as it rides upon the inclined surface $t^5$ will push the end $t^3$ of the lever against the spring $h^{11}$, thereby causing the inclined surface $t^5$ to act as a brake. The pitch or degree of inclination of the surface $t^5$, in conjunction with the tension of the spring $h^{11}$, is arranged to practically stop the machine before the clutch part reaches the notch $t^6$, at which point the spring $h^{11}$ throws the end $t^4$ of the lever $t$ toward the clutch part and the sides of the notch $t^6$ about said part, thereby positively stopping and locking the several parts of the machine.

To start the machine, the rock-shaft $f^2$ is given a movement to place the parts carried by it in the position shown in Fig. 1. The shaft $f^2$ is thrown into position shown in Fig. 1 by means of the bolt $c^2$, which may be operated by hand or by a suitable treadle (not shown) common in this class of machines. As the bolt $c^2$ is pushed back into position shown in Fig. 1 the plate $c$ engages the arm $f$ and throws the rock-shaft $f^2$ against the tension-spring $f^4$ to the position shown in Fig. 1, so that the end $h^8$ of the dog $h^4$ is in engagement with the sides of the groove $s^2$. The stop or lever $t$ being spring-pressed releases itself from the clutch part $n$ when the end $h^8$ of the dog $h^4$ is moved, as stated. The shaft $a'$ having completed the predetermined number of revolutions the wiper $a^7$ engages the pawl $b$ to trip the latter to permit the spring $c^3$ to throw the rod $c^2$ and the plate $c$ toward the shaft $a'$, thereby unlocking the rock-shaft $f^2$ and permitting the spring $f^4$ to rock said shaft to bring the end $h^7$ of the dog $h^4$ into engagement with the sides of the groove $s^2$. This movement serves to unclutch the wheel $s$ from the shaft $a'$ and at the same time to engage the stop $t$ with the clutch part $n$, the stop or lever $t$ acting as a combined brake or stop.

Having thus explained the nature of my invention and described a way of constructing and using the same, though without attempting to set forth all of the forms in which it may be made or all of the modes of its use, what I claim, and desire to secure by Letters Patent, is—

1. The combination of a main shaft having a clutch member, a loose driven wheel longitudinally movable on said shaft into and out of position for rotative engagement with said clutch member, a shipper movable transversely of the shaft and having an obliquely-disposed end coöperating with a suitable surface on the wheel to withdraw the latter from position of engagement with the clutch member, and means for operating said shipper.

2. The combination of a main shaft having a clutch member, a loose driven wheel longitudinally movable on said shaft into and out of position for rotative engagement with said clutch member, a double-acting shipper movable transversely of the shaft and having an obliquely-disposed acting part coöperating with opposed surfaces on the wheel to move the latter back and forth, and means for operating said shipper.

3. The combination of a shaft having a clutch member, a driven wheel loose on said shaft and movable longitudinally thereon into and out of position for rotative engagement with the clutch member, said wheel having an encircling groove, an oscillatory shipper in a plane transverse to the shaft and having an oblique acting part engaging the groove of the wheel and coacting with the sides thereof to move the wheel back and forth, and means for oscillating the shipper.

4. The combination of a main shaft having a clutch member, a loose driven wheel longitudinally movable on said shaft into and out of position for rotative engagement with said clutch member, a shipper movable transversely of the shaft and having an obliquely-disposed end coöperating with a suitable surface on the wheel to withdraw the latter from position of engagement with the clutch member, means tending to move the shipper in a direction to withdraw the wheel, and trip mechanism restraining said means and arranged to release at a predetermined time, substantially as described.

5. In a stop-motion, in combination, a shaft, a clutch part fast thereon, a driven wheel loosely mounted upon said shaft, a pivoted dog having an operating-face arranged in a plane at an angle to the axis of the shaft, complemental engaging parts upon said wheel and dog, a clutch part on said wheel, means for operating said dog to slide said wheel, and a combined brake and stop arranged to be engaged by said clutch part.

6. In a stop-motion, in combination, a shaft, a clutch part fast thereon, a wheel loosely mounted on said shaft, a clutch part on said wheel, a dog-operating member, means controlled by said shaft for operating said member at a predetermined time, a dog carried by said member, and having an operating-face arranged in a plane at an angle to the axis of the shaft, complemental engaging parts upon said dog and wheel, and a spring-pressed cam carried by said member, and arranged to be moved into engagement with said shaft clutch part when said wheel is unclutched.

7. In a stop-motion, in combination, a shaft, a clutch part fast thereon, a wheel loose on said shaft and provided with a complemental clutch part, a rock-shaft, a dog carried by said rock-shaft, and having an arc-shaped operating-face arranged in a plane at an angle to the axis of the shaft, complemental engaging parts on said dog and wheel, a spring-pressed cam carried by said rock-shaft, and arranged to be moved into and out of engagement with said shaft clutch part, and means for operating said rock-shaft at a predetermined time.

8. In a stop-motion, in combination, a shaft, a clutch part fast on said shaft, a wheel loose on said shaft provided with complemental clutch part, a spring-pressed rock-shaft, a dog carried by said rock-shaft having an arc-shaped operating-face arranged in a plane at an angle to the axis of said shaft, a combined spring-pressed brake and stop carried by said rock-shaft, and adapted to be moved into the path of said shaft clutch part when said wheel is unclutched, means for holding said rock-shaft in one direction against the tension of its spring, and means controlled by said shaft for operating said first-mentioned means to release said rock-shaft whereby said wheel may be slid upon the shaft, and said brake and stop thrown into or out of engagement with the said shaft clutch part.

In testimony whereof I have signed my name to this specification, in the presence of two subscribing witnesses, this 30th day of January, A. D. 1896.

ROBERT L. LYONS.

Witnesses:
A. D. HARRISON,
A. D. ADAMS.